United States Patent [19]
Serfling

[11] 3,916,833
[45] Nov. 4, 1975

[54] AQUEOUS CRUSTACEAN CULTURE SYSTEM

[76] Inventor: Steven A. Serfling, 1314 L St., Davis, Calif. 95616

[22] Filed: Mar. 4, 1974

[21] Appl. No.: 448,082

[52] U.S. Cl. .................... 119/2; 119/18; 119/52 AF
[51] Int. Cl.² ........................................ A01K 61/02
[58] Field of Search ............................. 119/2–5, 18, 119/22, 52 AF, 52 B

[56] References Cited
UNITED STATES PATENTS

| | | | |
|---|---|---|---|
| 2,339,043 | 1/1944 | Armstrong | 119/18 |
| 3,229,663 | 1/1966 | Conover | 119/52 B X |
| 3,702,599 | 11/1972 | Herolzer | 119/4 |
| 3,741,159 | 6/1973 | Halaunbrenner | 119/2 X |

FOREIGN PATENTS OR APPLICATIONS

| | | | |
|---|---|---|---|
| 2,007,486 | 8/1971 | Germany | 119/18 |

*Primary Examiner*—J. N. Eskovitz
*Attorney, Agent, or Firm*—Warren, Chickering & Grunewald

[57] ABSTRACT

An aqueous culture system having a plurality of vertically superimposed compartments adapted for submersion in water and sized for individual housing of crustaceans; a plurality of food particle platforms one each associated with and accessible to each compartment and a plurality of food particle descent passages aligned with the platforms in an arrangement providing substantially equal distribution to the platforms of heavier than water food particles delivered onto the top of the water in which the compartments are submerged. The system also provides for the use of excess food and waste products in supporting a continuous life cycle within the aqueous habitat.

7 Claims, 10 Drawing Figures

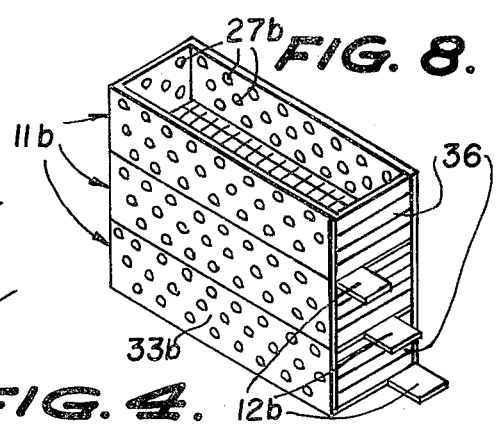
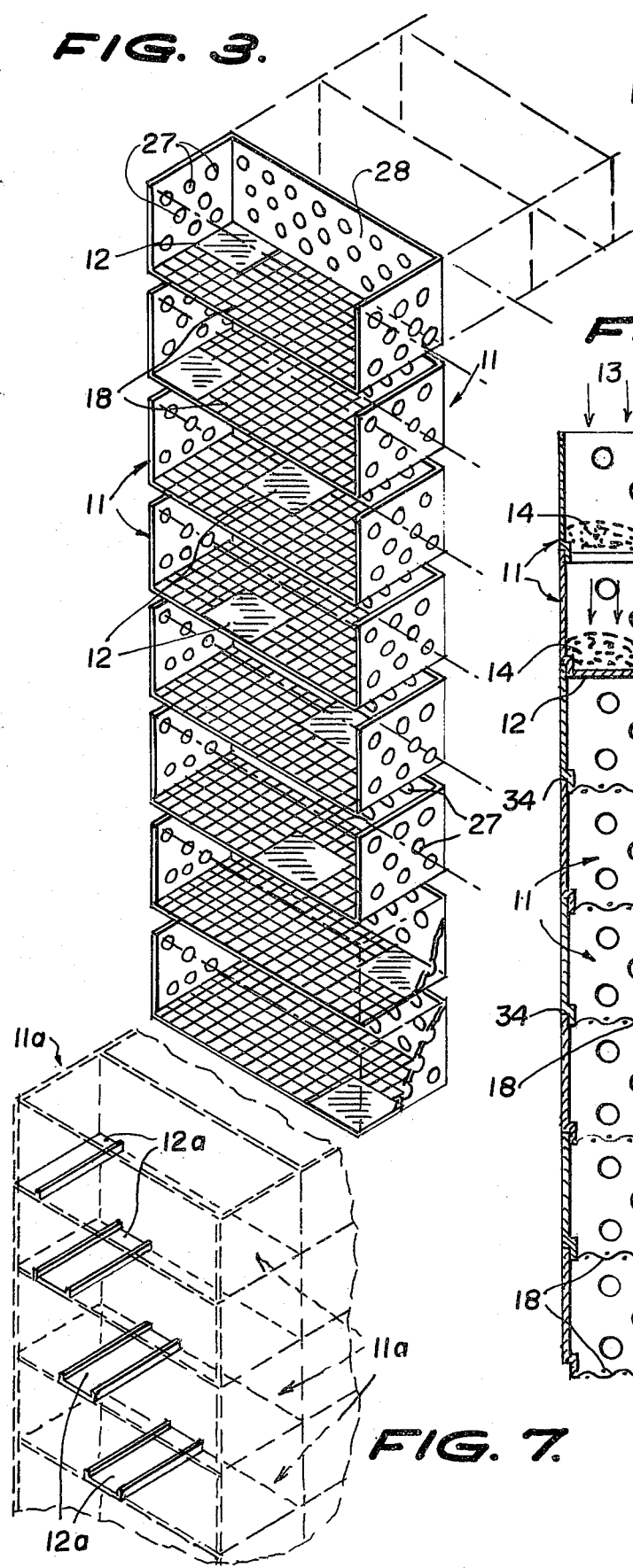
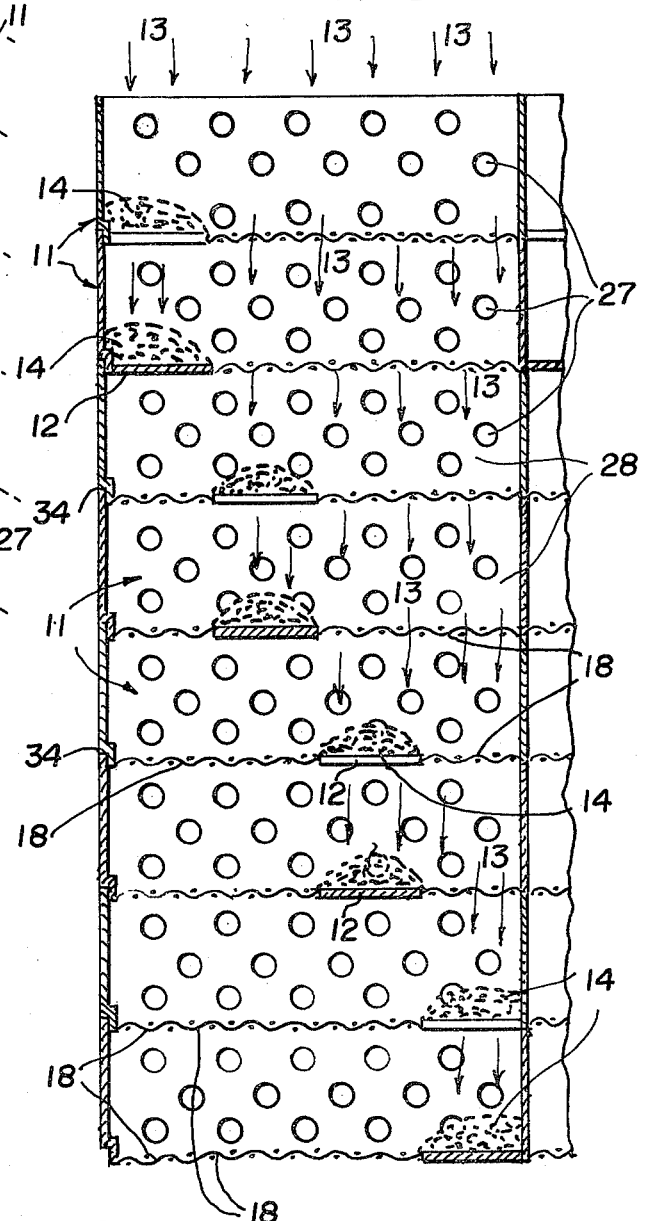

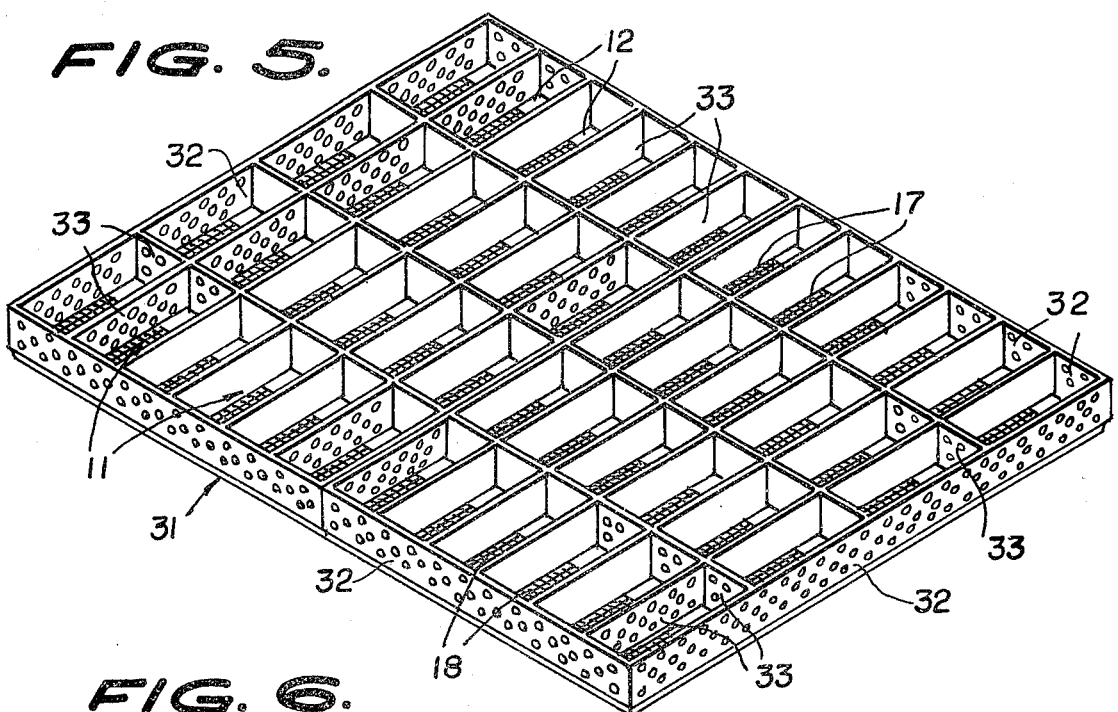
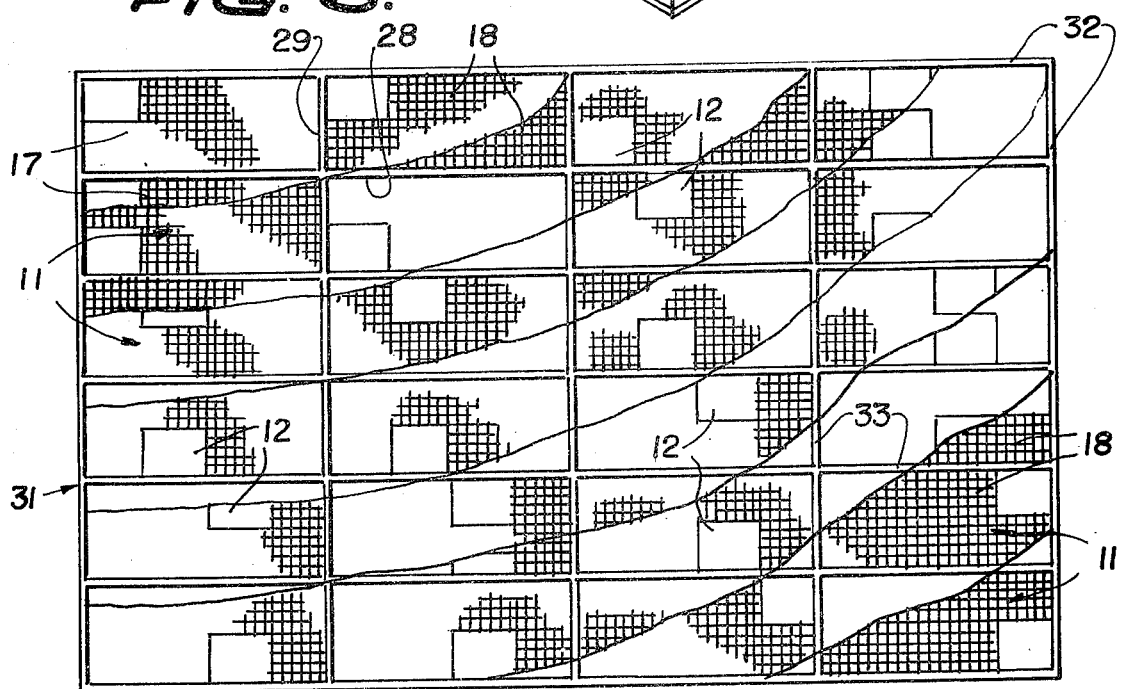
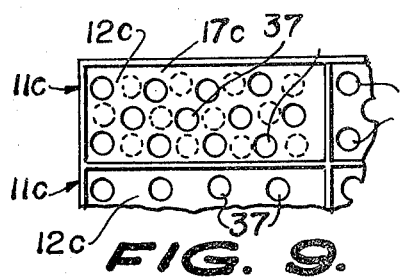
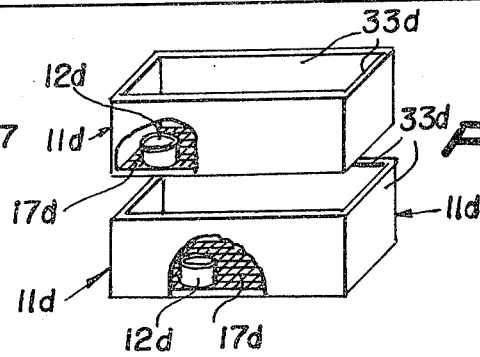

AQUEOUS CRUSTACEAN CULTURE SYSTEM

BACKGROUND OF THE INVENTION

1. Field of Invention

The invention relates to the art of farming or aquaculture of post-larva crustaceans such as shrimps, lobsters, crabs, crayfish, and the like and particularly to the culturing of the cannibalistic or clawed varieties of such crustaceans.

2. Description of Prior Art

For present purposes crustaceans may be divided into two general categories when considering methods for their controlled farming or aquaculture, viz:

1. Social, non-aggressive types, without claws e.g., saltwater shrimps of the penaid family, and spiny lobsters of the panulirid family.

2. Anti-social, aggressive, cannibalistic types with claws e.g. freshwater shrimps (Macrobrachium), New England lobsters (Homarus), crabs, crayfish.

Crustaceans of the first type i.e. social, non-aggressive types, have been successfully cultured in a controlled, high-density environment. However, great difficulty and loss has been encountered in attempting culture of the second type i.e. the aggressive, cannibalistic varieties due to their tendancy to fight and cannibalize each other when placed in a high-density environment. The problem is particularly aggravated with the crustaceans noted because in order to grow, they must shed their hard exoskeleton (moult) and, before the hardening of their new, enlarged exoskeleton is complete, they are soft and completely vulnerable to others. As a result, cultivation of these types of crustaceans in ponds or other controlled mass holding situations has been limited to a yield of only one or two adults per square meter.

Attempts to raise cannibalistic crustaceans in higher densities have contemplated the increase in amount of shelter available to provide refuges for newly moulted individuals as well as enclosures for others in order to reduce aggressive interactions. For example prior art U.S. Pat. Nos. such as 3,658,034 and 3,724,423 propose the use of an array of cylindrical pipe sections stacked vertically on diagonal ladder lines within the crustacean growing tank in order to provide at least some protection for the individual crustaceans against the aggressive actions of others. However, the individual crustaceans are required to leave the protection of their individual habitats to obtain food which is deposited on the bottom of the tank. It was postulated that the crustaceans will recognize the bottom of the tank as a neutral territory and will not attack one another during recovery of food; and that following eating, the crustaceans will return to their established habitat. Whatever the validity of such postulate, the structure proposed will result in a significant and serious population loss in the case of at least certain crustaceans such as Macrobrachium. Furthermore the individual crustacean holding cells are open to permit ingress and egress of crustaceans and do not provide complete security for the crustaceans even when positioned in their individual cell.

Holding tanks have been devised as, for example, see U.S. Pat. No. 2,302,336, for storing shellfish, such as lobsters, for a period of time after being caught and in which the lobsters are contained within individual compartments. However, the apparatus is intended to keep the lobsters alive and in healthy condition for only a temporary period, seven to ten days, after being caught.

It has been demonstrated that at least certain crustaceans such as Homarus, the New England lobster, and Macrobrachium can be raised from post-larval to full market size without growth inhibition even when confined to a compartment only slightly larger than the animal. The potential is thus suggested for achieving aqueous crustacean culture at high density. However, engineering problems are encountered in attempting to provide food to and remove waste from each animal automatically and economically. Two approaches have been taken. The first is holding crustaceans in shallow tanks containing individual compartments one level deep. This approach was originally developed by this applicant at California State University, San Diego (1968-1972) and later at University of California at Davis and at the Bodega Marine Laboratory, Bodega Bay, California (1972-1973). The primary inadequacy of this design was the cost of constructing and maintaining the numerous tanks making up the vertical assembly and, plumbing systems, feeding systems, waste removal system, etc. for each tank. Until the advent of the present invention, no system had satisfactorily responded to the requirement of feeding crustaceans contained within multilevel individual cages in a single deep tank. No satisfactory method has been heretofore devised to the delivery of food to the animals in the middle and lower levels and the removal of waste therefrom. Mechanically driven food distribution and waste removal systems have been costly, awkward, and ineffective.

Other references are Robert Cordover, Penaid Prawn production, American Fish Farmer Magazine, Oct. 1972; R. L. Coykendall, 1973, The Culture of Crayfish Native to Oregon, Masters Thesis, Oregon State University; J. F. Wickins and J. R. M. Forster, 1973, Intensive Methods for Culture of Tropical Shrimp, Fish Farming International, vol. 1, no. 1, pp. 76; D. R. McBurney and D. G. Wilder, 1973, Survival and Condition of Lobsters in a Tide Pond Related to Feeding, Cover, and Stock Density, Fish. Res. Bd. of Canada, Tech, Rept. No. 377; W. L. Rickards, 1971, Studies of the Use of Vertical Substrates for Improving Production of Pink Shrimp Penaus duorarum, Sea Grant Bulletin No. 10, University of Miami; R. A. Neal, 1973, Progress Toward Shrimp Farming in the United States, Marine Fisheries Review, vol. 35, nos. 3-4; C. R. Mock, 1973, Shrimp Culture in Japan, Marine Fisheries Review, vol. 35, nos. 3-4; D. Rutherford, 1973, Genetic Principles; Systems Engineering used in Continent-Spanning Lobster-Farming Project, American Fish Farmer, August 1973.

SUMMARY OF INVENTION

The aqueous culture system of the present invention provides for the individual housing of crustaceans in compartments positioned multilevel deep in one tank with provision for simple and effective distribution of food particles to the animals in each compartment and the continuous and effective removal of waste products. Specifically, the present invention provides a food particle platform for each compartment and a plurality of vertical food particle descent passageways aligned with the platforms, whereby the uniform delivery of food particles to the platforms may be simply effected by a uniform delivery over the top of the water in which the compartments are submerged, and in registration with the descent passageways, of heavier than water food particles.

An object of the present invention is to provide an aqueous crustacean culture system of the character described in which the crustaceans may not only be housed and protected in individual compartments with the uniform delivery of food particles to the animals as above noted; but also in which excess food and waste products will be continuously consumed in a supporting life cycle maintained within the aqueous habitat. Post-larval crustaceans placed one in each compartment will not normally need be handled again until the crustacean reaches market size.

Another object of the present invention is to provide a culture apparatus of the character which may be economically produced, and simply and efficiently maintained and operated.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims

BRIEF DESCRIPTION OF DRAWINGS

FIG. 3 is a fragmentary, exploded, perspective view on a somewhat enlarged scale, of a portion of the apparatus.

FIG. 4 is a vertical sectional view taken through the assembly of parts shown in FIG. 3.

FIG. 5 is a perspective view of a portion of the apparatus of one form of the invention.

FIG. 6 is a plan view with the parts broken away of a series of stacked trays as depicted in FIG. 5.

FIG. 7 is a fragmentary perspective view of a modified form of the invention.

FIG. 8 is a fragmentary perspective view of a second modified form of the invention.

FIG. 9 is a fragmentary plan view of a third modified form of the invention.

FIG. 10 is an exploded perspective view, with parts broken away and in section, illustrating a fourth modified form of the invention.

DETAILED DESCRIPTION OF INVENTION

Figure 1:
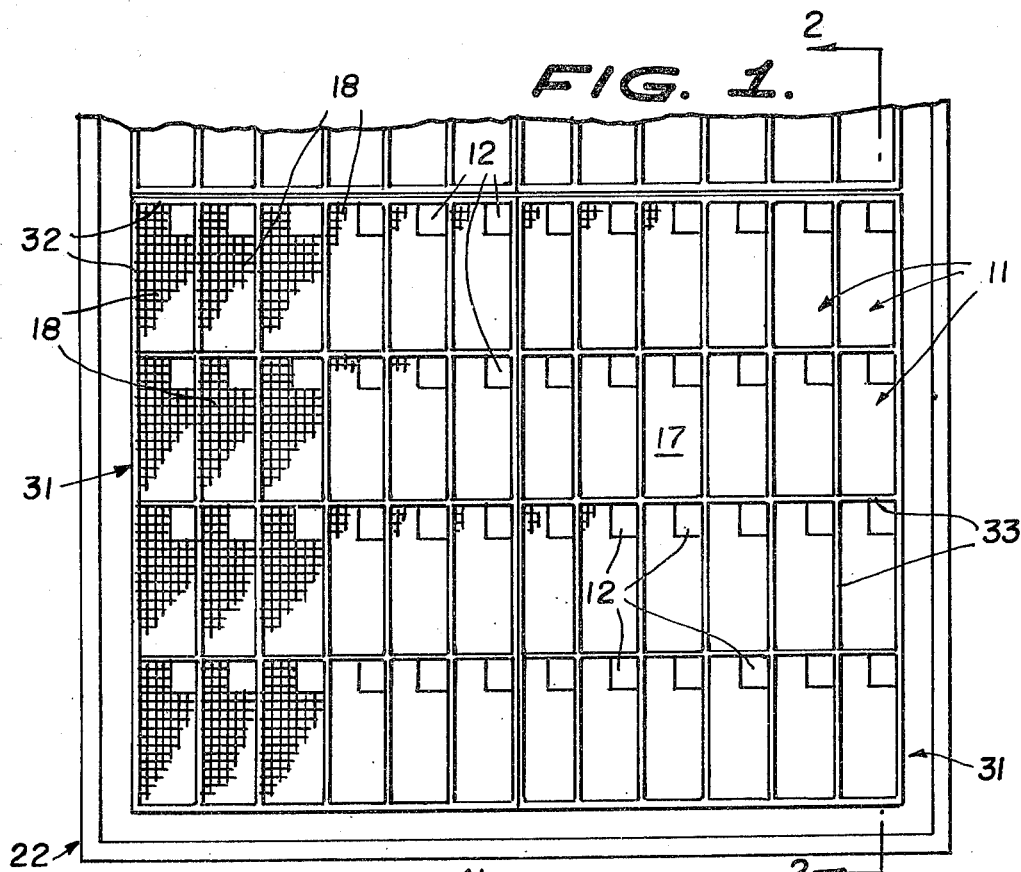
FIG. 1 is a fragmentary top plan view of an aqueous crustacean culture system constructed in accordance with the present invention and with a top screen removed.
Figure 2:
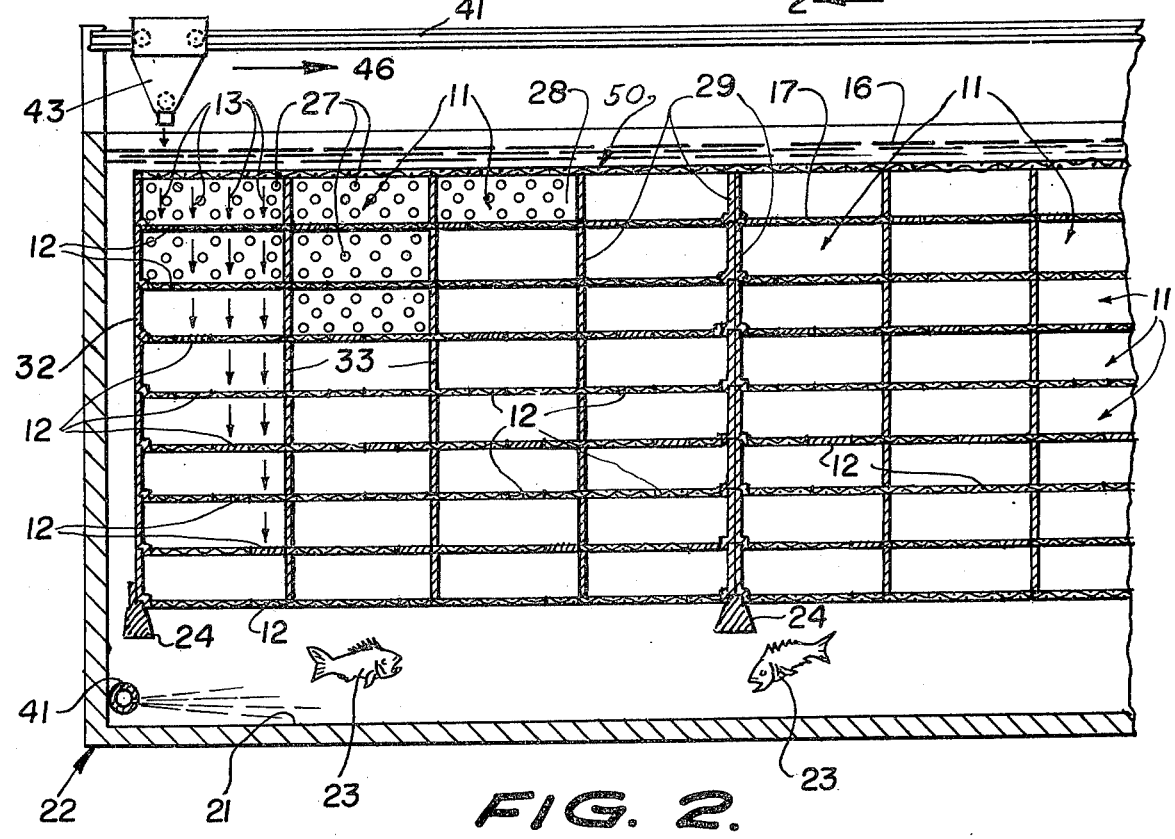
FIG. 2 is a fragmentary vertical sectional view taken substantially on the plane of line 2—2 of FIG. 1.

The aqueous crustacean culture system of the present invention comprises briefly a plurality of vertically superimposed compartments 11 adapted for submersion in water and sized for individual housing of crustaceans; a plurality of food particle platforms 12 one each associated with and accessible to each compartment 11; a plurality of vertical food particle descent passageways 13, see arrows in FIGS. 2 and 4, one each aligned with each platform 12; the platforms and passageways being proportioned and disposed for substantially equal distribution to the platforms of heavier than water food particles 14 delivered onto the top surface 16 of the water in which the compartments are submerged. Generally the several food platforms 12 are offset horizontally one from the other with the several passageways 13 substantially contiguous. Thus food particles 14 uniformly distributed on the top surface 16 of the water will descend with a substantially uniform horizontal distribution onto the several platforms located in compartments at different levels, the platforms of lower compartments being horizontally offset from the platforms of the higher compartments.

In the form of the invention illustrated in FIGS. 1-7 the compartments are formed with bottoms 17 comprising contiguous particle supporting and particle passing areas providing the aforementioned platforms 12 and passageways 13. The particle supporting area may be formed as an imperforate plate having a surface area small compared to the floor area of the compartment. Alternatively the particle supporting area may consist of a relatively fine screen having openings substantially smaller than the food particle to be supported. The size of the platform will be related to the number of compartments in a single vertical array. For example, where eight vertical compartments are shown superimposed in each vertical array in FIGS. 1 and 2, the food platform in each compartment may comprise approximately one-eighth of the bottom area. The balance of the bottom area in each compartment is covered with a larger mesh screen 18, having a mesh size substantially larger than the food particles, and which permit the free descent of food particles and animal waste products. As an important feature of the present invention, excess food as well as animal waste products descent vertically to the bottom 21 of the tank 22 in which the compartments are submerged; and live fish 23 are maintained within the tank and of a species selected for the consumption of such excess food and waste products as may gravitate to the tank bottom. To facilitate this clean up operation, support means 24 is provided in the tank for elevating the lowermost compartments from the tank bottom 21 so as to provide a fish channel 26 therebetween for accommodating fish 23 cruising the bottom of the tank. Carp, koi, and goldfish may be used for this purpose.

As a further and important feature of the present invention, the compartments are formed with openings 27 in their side and end walls 28 and 29 which are substantially smaller than the crustaceans being housed but sufficiently large for passage therethrough of aqueous animals selected of a size for movement through openings 27 and of a species for consuming excess food and also any deceased crustaceans. Openings of about one-quarter inch will accommodate a variety of waste eating fish, snails and arthropods which will be kept in the tank. The crustaceans will take all of the food they desire from the food platform. During moulting periods less food is consumed. Excess food on the platforms will generally be kicked down by the crustacean in the compartment and the food will descend to the next lower aligned platform for crustacean feeding or will ultimately get shuffled down to the bottom 21 of the tank. In previous crustacean growing systems there was no provision for the passing on of food from one compartment to another in accordance with the needs of the animals. The fish, snails and arthropods roaming through the compartments will consume any dead crustaceans and will in turn be caught and eaten by the live crustaceans in a constant recycling process. At the same time the larger fish are preferably kept slightly underfed so that they will clean up everything deposited on the bottom of the tank. The present system is unique in that the crustaceans may be maintained a little overfed without danger of polluting the system. In the present system, overfeeding of the crustaceans is not a concern because excess food will be passed on down to all of the animals and finally if the crustaceans have taken all they want, the food gets passed down to the bottom fish 23 which will consume not only the excess food, but also the animal waste products which are similarly passed down to the bottom of the tank.

The compartment assembly may be fabricated from a plurality of trays 31 as seen in FIG. 5 each having a bottom wall 17, side walls 32 and partition walls 33, which form the side and end walls 28–29 of the individual compartments; the trays being stacked one upon another in a vertical tier as seen in FIG. 6 with the tray bottom, side and partition walls defining the several compartments 11 and with the bottom wall of each upper tray defining the top of the compartments formed by the adjacent lower tray. A screen 50 is preferably placed over the top of the stack, as seen in FIG. 2, the screen having openings for descent therethrough of food particles distributed over the top surface 16 of the water. As hereinabove described, the tray bottoms are formed to provide the particle supporting and particle passing areas 12 and 18 for each compartment. Tray interlocking means 34 may be provided as shown in FIG. 4 so as to anchor the trays together in one solid unit.

A modified form of the invention is illustrated in FIG. 7, wherein the tray bottom may be formed as a continuous grid to establish the vertical passageways for descent of food particles and waste products, and the food supporting areas 12a may be provided by substantially imperforate channel-shaped strips laid across the width of each compartment 11a and staggered horizontally, as seen in FIG. 7, with the food platform 12a of a lower compartment being offset from the food platform of the adjacent upper compartment.

A further modified form of the invention is illustrated in FIG. 8, wherein the food platforms 12b are mounted exteriorally of compartments 11b and each compartment is formed with a crustacean claw access opening 36 to its associated platform 12b. This type of structure may be used with crustaceans such as Macrobrachium which have small claws which may reach through opening 36 to take food from the outside platform without permitting release of the animal through opening 36. In the structure illustrated, platforms 12b may be formed as horizontal extensions of the compartment bottom; and, as in the other embodiments, the platforms are offset horizontally from each other so as to provide the vertical food particle descent passageways to each of the platforms. The grid bottom of the compartment provides for the vertical descent of animal waste products to the bottom of the tank as above explained. If desired, the compartments 11b may be positioned end to end so that two adjacent compartments may share a common food platform 12b.

Other arrangements for the food supporting areas or platforms are shown in FIGS. 9 and 10. In the structure illustrated in FIG. 9, a plurality of openings 37 are distributed over the bottom 17c of each compartment 11c for passage of food particles and waste products and which leave between the openings food particle platform areas 12c. The openings 37 in the bottom of the compartments are staggered at adjacent levels so as to provide the substantially equal distribution to the various platforms of food particles as above explained.

In the form of the invention illustrated in FIG. 10, the bottoms 17d of each of the compartments 11d may be formed as a continuous grid; and the food supporting platforms 12d are in the form of open top cups for retaining food particles therein. The cups are staggered, as illustrated in FIG. 10, so as to provide for the uniform distribution thereto of food particles deposited on the top surface of the water.

Preferably, one or more tanks of the character described are mounted within a green house type solarium for optimum environmental control and elimination of adverse crustacean growing conditions occasioned by storms, floods, predators, water and air pollution which may be experienced in exposed, uncontrollable ponds. At the same time, solar heat minimizes energy costs for maintaining ideal warm water temperatures; and heat losses may be further reduced by using insulated tanks and by filtering and recirculating the water in the tanks. A water conduit discharge 41 is illustrated for this purpose in FIG. 2.

The delivery of food particles to the compartments may be conveniently and automatically accomplished by a food particle discharging hopper 43 here shown mounted for movement, as suggested by arrow 46, on an overhead rail 41 for the uniform distribution of food particles onto the top surface 16 of the water. No other machinery or moving parts are required to complete the delivery of the food particles, the latter descending under simple gravitational force uniformly onto the food particle platforms associated with the compartments.

The individual compartments may be fitted with doors, if desired, for movement of crustaceans into and out of the compartments; and, preferably, at least some transparent walls are provided for observing the feeding and maturing of the crustaceans.

Densities of 150 to 300 adults per square meter of floor space are possible with the system of the present invention as compared to densities of usually only one or two adults per square meter as above noted. The unique combination of the food particle platforms and vertical descent passageways as hereinabove described permits individual holding of crustaceans, in multilevels, all in one tank, and provides a method in which both food pellets and waste material can be easily distributed to and removed from each compartment at all levels simultaneously and automatically by the simple and reliable use of gravity.

What is claimed is:

1. An array of vertically superimposed compartments adapted for submersion in water and each sized to house, and each having a bottom adapted to support, a crustacean;

each said bottom being subdivided into contiguous particle-retaining and particle-passing areas, each of said particle-passing areas being formed for support of a crustacean and for conjoint gravitation therethrough of food particles and animal waste, said particle-retaining areas being each formed for support of food and animal waste particles;

said particle-retaining areas at different levels being horizontally offset one from the other and collectively providing when viewed in plan a substantially complete coverage of the horizontal dimensions of said array, whereby heavier-than-water food particles distributed onto the water surface overlying said array will gravitate into distributed portions on said particle-retaining areas.

2. Apparatus as defined in claim 1, a water tank for containing said compartments;

said particle passage areas being formed for descent of surplus food and crustaceans waste products therethrough for gravitation of said products to the bottom of said tank; and means for supporting said compartments in elevated position over said tank bottom to provide a fish channel therebetween.

3. Apparatus as defined in claim 2, adapted for use in conjunction with aqueous animals selected of a small size and species consuming crustacean wastes and diseased crustaceans, said compartments having openings therein smaller than said crustaceans and larger than said aqueous animals.

4. Apparatus as defined in claim 2, water in said tank having a top surface above said array; and means for depositing food particles on said top surface substantially uniformly over said array.

5. Apparatus as defined in claim 2, a plurality of trays each having a bottom wall, side walls and at least one partition wall, said trays being stacked one upon another in a vertical tier with said bottom, side and partition walls defining said compartments and with the bottom wall of an upper tray defining the top of compartments formed by the adjacent lower tray; and said tray bottom walls being formed to provide said particle supporting and particle passing areas for each compartment.

6. Apparatus as defined in claim 2, a plurality of said particle-retaining areas being distributed over the bottom of each compartment.

7. Apparatus as defined in claim 2, each of said particle-retaining areas comprising a cup-shaped, food particle retaining receptacle.

* * * * *

UNITED STATES PATENT OFFICE
CERTIFICATE OF CORRECTION

PATENT NO. : 3,916,833
DATED : November 4, 1975
INVENTOR(S) : Steven A. Serfling It is certified that error appears in the above-identified patent and that said Letters Patent are hereby corrected as shown below:

Column 4, line 34, change "descent" to ---descend---.

Signed and Sealed this ninth Day of March 1976

[SEAL]

Attest:

RUTH C. MASON
Attesting Officer

C. MARSHALL DANN
Commissioner of Patents and Trademarks